US011104455B2

(12) United States Patent
Dong et al.

(10) Patent No.: US 11,104,455 B2
(45) Date of Patent: *Aug. 31, 2021

(54) HEALTH MONITORING OF AIRCRAFT LANDING GEAR MECHANICAL STRUCTURES

(71) Applicant: THE BOEING COMPANY, Chicago, IL (US)

(72) Inventors: John J. Dong, Bothell, WA (US); Mark N. Simpson, Kirkland, WA (US); Roland Hinton, Renton, WA (US); Naveed Hussain, Palos Verdes Peninisula, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,727

(22) Filed: Dec. 20, 2019

(65) Prior Publication Data
US 2020/0122860 A1    Apr. 23, 2020

Related U.S. Application Data

(62) Division of application No. 15/941,373, filed on Mar. 30, 2018, now Pat. No. 10,577,128.

(51) Int. Cl.
*B64F 5/60* (2017.01)
*B64C 25/00* (2006.01)
(Continued)

(52) U.S. Cl.
CPC .............. *B64F 5/60* (2017.01); *B64C 25/001* (2013.01); *B64C 25/60* (2013.01); *G01B 11/14* (2013.01);
(Continued)

(58) Field of Classification Search
CPC ... B64C 25/001; G01B 11/14; G06K 9/00791
(Continued)

(56) References Cited

U.S. PATENT DOCUMENTS

| 2,868,482 A | * | 1/1959 | Westcott, Jr. | ........... B64C 25/10 244/102 R |
| 3,954,232 A | * | 5/1976 | Harper | .................. B64C 25/001 244/102 R |

(Continued)

FOREIGN PATENT DOCUMENTS

| EP | 2489591 A1 | 8/2012 |
| GB | 1012604 A | 12/1965 |

(Continued)

OTHER PUBLICATIONS

European Patent Office Examination for Application No. 19 163 636.4-1010 dated Aug. 13, 2019.
(Continued)

*Primary Examiner* — Omar Casillashernandez
(74) *Attorney, Agent, or Firm* — Patterson + Sheridan, LLP

(57) ABSTRACT

Methods and systems are provided that facilitate the maintenance of levered landing gears by monitoring the condition of the stop pads of such landing gears. One embodiment provides for calibrating a sensor for measuring a condition of a stop joint formed by a first stop pad and a second stop pad of a levered landing gear against a nominal condition of at least one of the first stop pad and the second stop pad; monitoring, by the sensor, a current condition of the at least one of the first stop pad and the second stop pad from the nominal condition; determining whether a non-conformance from the nominal condition of the at least one of the first stop pad and the second stop pad has been detected by the sensor
(Continued)

for the current condition; and in response to determining that the non-conformance has been detected, generating an alert.

20 Claims, 10 Drawing Sheets

(51) Int. Cl.
*G01B 11/14* (2006.01)
*G06K 9/00* (2006.01)
*B64C 25/60* (2006.01)
*B64D 45/00* (2006.01)
*B64D 47/08* (2006.01)

(52) U.S. Cl.
CPC .... *G06K 9/00791* (2013.01); *B64C 2025/008* (2013.01); *B64D 47/08* (2013.01); *B64D 2045/0085* (2013.01)

(58) Field of Classification Search
USPC .......................................................... 340/960
See application file for complete search history.

(56) References Cited

U.S. PATENT DOCUMENTS

| | | | |
|---|---|---|---|
| 4,065,078 A | 12/1977 | Jenkins et al. | |
| 4,837,615 A * | 6/1989 | Boshier | B82Y 15/00 |
| | | | 348/135 |
| 6,318,669 B1 * | 11/2001 | Dazet | B64C 25/00 |
| | | | 244/100 R |
| 6,409,121 B1 * | 6/2002 | Lindahl | B64C 25/02 |
| | | | 244/100 R |
| 6,824,100 B1 * | 11/2004 | Cheetham | B64C 25/20 |
| | | | 244/102 R |
| 7,370,830 B2 | 5/2008 | Clark | |
| 7,954,757 B2 * | 6/2011 | Moe | B64C 25/34 |
| | | | 244/100 A |
| 8,042,765 B1 | 10/2011 | Nance | |
| 8,651,417 B2 * | 2/2014 | Hilliard | B64C 25/34 |
| | | | 244/100 R |
| 8,939,400 B2 * | 1/2015 | Mellor | B64C 25/00 |
| | | | 244/100 R |
| 8,955,799 B2 * | 2/2015 | Devillers | B64C 25/58 |
| | | | 244/100 R |
| 9,452,827 B2 * | 9/2016 | Haynes | B64C 25/58 |
| 9,994,309 B2 * | 6/2018 | Hodgkinson | B64C 25/60 |
| 10,202,204 B1 * | 2/2019 | Daidzic | B64D 45/08 |
| 2003/0033927 A1 * | 2/2003 | Bryant | B64C 25/62 |
| | | | 91/471 |
| 2006/0065779 A1 * | 3/2006 | McCoskey | B64F 1/22 |
| | | | 244/100 R |
| 2011/0159783 A1 * | 6/2011 | Fukushima | B24B 49/12 |
| | | | 451/11 |
| 2011/0233327 A1 * | 9/2011 | Mellor | B64C 25/20 |
| | | | 244/102 A |
| 2012/0198926 A1 * | 8/2012 | Baumgartner | F16D 66/00 |
| | | | 73/132 |
| 2013/0264417 A1 | 10/2013 | Devillers et al. | |
| 2015/0118766 A1 * | 4/2015 | Xu | H01L 22/26 |
| | | | 438/10 |
| 2015/0369318 A1 * | 12/2015 | Kang | F16D 66/024 |
| | | | 188/1.11 L |
| 2016/0052642 A1 * | 2/2016 | Gordon | B64C 25/34 |
| | | | 701/3 |
| 2016/0068277 A1 * | 3/2016 | Manitta | B64C 39/024 |
| | | | 244/114 R |
| 2016/0138665 A1 * | 5/2016 | Antanaitis | F16D 66/026 |
| | | | 701/70 |
| 2016/0144982 A1 * | 5/2016 | Sugumaran | B64F 1/005 |
| | | | 244/103 R |
| 2016/0349213 A1 * | 12/2016 | Kollgaard | G01N 29/0645 |
| 2017/0335912 A1 * | 11/2017 | Koh | F16D 66/022 |
| 2018/0134161 A1 * | 5/2018 | Gaither | B60T 8/172 |
| 2019/0135257 A1 * | 5/2019 | Medinei | B60T 13/662 |
| 2019/0264764 A1 * | 8/2019 | Lin | F16D 65/00 |
| 2019/0300204 A1 | 10/2019 | Dong et al. | |
| 2020/0103905 A1 * | 4/2020 | Gurin | G05D 1/0088 |

FOREIGN PATENT DOCUMENTS

| | | | |
|---|---|---|---|
| KR | 20090012681 | * | 2/2009 |
| KR | 20090012681 A | | 2/2009 |

OTHER PUBLICATIONS

European Patent Office Examination for Application 19 163 636.-1010 dated Mar. 27, 2020.

* cited by examiner

HEALTH MONITORING OF AIRCRAFT LANDING GEAR MECHANICAL STRUCTURES

CROSS-REFERENCE TO RELATED APPLICATIONS

This application is a divisional of co-pending U.S. patent application Ser. No. 15/941,373 filed March, 2018, which is incorporated herein in its entirety.

FIELD

Aspects of the present disclosure provide improved monitoring for landing gear systems and improvements to the aircraft that employ such landing gear systems.

BACKGROUND

The present invention relates to landing gear systems, and more specifically, to levered landing gear systems. A levered landing gear is designed to travel between an extended position and a static position during takeoff and landing operations, and will remain in the static position to support the weight of the aircraft while resting on the ground or taxiing. When in the static position, paired stop pads—at least one strut or "upper" pad and at least one truck or "lower" pad—come into contact with one another to arrest the travel of the landing gear from the extended position. Arresting this travel requires the stop pads, and the levered landing gear as a whole, to carry significant static, dynamic, and impact loads to support the aircraft while on the ground. These stop pads are in typically contact with one another while the aircraft is on the ground, and are generally not visible to maintenance and service personnel unless the weight of the aircraft is shifted off of the levered landing gear, which is an expensive and time consuming operation that is often conducted as scheduled maintenance.

SUMMARY

The present disclosure provides in one embodiment levered landing gear, comprising: a first shock strut having a longitudinal axis, the first shock strut including first stop pad having a first contact surface; a second shock strut disposed concentrically with the first shot strut along the longitudinal axis such that the first shock strut and the second shock strut extend along a shared extension axis; a truck lever coupled to the first shock strut and the second shock strut such that the second shock strut pivots the truck lever relative to the first shock strut, the truck lever including a second stop pad having a second contact surface, wherein the truck lever pivots between an extended position and a static position relative to the first shock strut, and wherein the first contact surface makes physical contact with the second contact surface when the truck lever is in the static position to form a stop joint for the levered landing gear; and a first sensor disposed with the levered landing gear and configured to measure a first condition of the stop joint.

In one aspect, in combination with any example above or below, the first sensor is a camera disposed of in the first stop pad, and the first condition of the stop joint measured by the camera includes at least one of: a debris presence in the stop joint and a surface condition of the second contact surface.

In one aspect, in combination with any example above or below, the camera is a three-dimensional camera mounted in first stop pad via a camera spring and includes a light oriented to shine on the second stop pad while the levered landing gear is in the extended position.

In one aspect, in combination with any example above or below, the first sensor is a gap sensor disposed of in the first stop pad, and the first condition of the stop joint measured by the gap sensor includes a gap distance between at least a portion of the first contact surface and at least a portion of the second contact surface.

In one aspect, in combination with any example above or below, the gap sensor is an eddy current sensor mounted in a fixed position within the first stop pad.

In one aspect, in combination with any example above or below, the first sensor is a thickness sensor disposed of in the second stop pad, and the first condition of the stop joint measured by the thickness sensor includes a thickness of the second stop pad.

In one aspect, in combination with any example above or below, the thickness sensor is an ultrasound sensor held in contact with a second mounting surface of the stop pad via a spring, the second mounting surface opposite to the second contact surface of the second stop pad.

In one aspect, in combination with any example above or below, the levered landing gear further comprises a second sensor disposed with the levered landing gear that measures a second condition of the stop joint.

In one aspect, in combination with any example above or below, the first sensor is a camera mounted on the first shock strut, and the first condition of the stop joint measured by the camera includes at least one of: a debris presence in the stop joint and a surface condition of the second contact surface; and the levered landing gear further includes a second sensor, wherein the second sensor is a gap sensor disposed of in the first stop pad, and the second condition of the stop joint measured by the gap sensor includes a gap distance between at least a portion of the first contact surface and at least a portion of the second contact surface.

In one aspect, in combination with any example above or below, the first sensor is a camera disposed of in the first stop pad, and the first condition of the stop joint measured by the camera includes at least one of: a debris presence in the stop joint and a surface condition of the second contact surface; and the levered landing gear further includes a second sensor, wherein the second sensor is a thickness sensor disposed of in the second stop pad, and wherein the second condition of the stop joint measured by the thickness sensor includes a thickness of the second stop pad.

In one aspect, in combination with any example above or below, the levered landing gear further comprises a computing device in communication with the first sensor that compares the measured condition against a threshold and, in response to the measured condition satisfying the threshold, generates an alert associated with the measured condition.

The present disclosure provides in another embodiment, a stop pad in a levered landing gear, comprising: a first contact surface, disposed of in the levered landing gear relative to a second contact surface of the levered landing gear so as to form a stop joint for a static position of the levered landing gear with the second contact surface; and a first sensor disposed of within the stop pad, wherein the first sensor measures a condition of the stop joint.

In one aspect, in combination with any example above or below, the first sensor is a camera sensor focused on the second contact surface, and the condition of the stop joint is measured according to a visual appearance of the second contact surface.

In one aspect, in combination with any example above or below, the first contact surface is defined by a truck pad of the levered landing gear, wherein the first sensor is a gap sensor, and wherein the condition is a gap distance between the first contact surface and the second contact surface while the levered landing gear is in a static position.

In one aspect, in combination with any example above or below, a second sensor of a camera sensor is focused on the second contact surface defined in a strut pad of the levered landing gear, wherein the second sensor is signaled to capture of an image of the second contact surface while the levered landing gear is in an extended position and correlate the image with the gap distance measured while the levered landing gear is in the static position.

In one aspect, in combination with any example above or below, the first contact surface is defined in a truck pad of the levered landing gear, wherein the first sensor is a thickness sensor, and wherein the condition is a pad thickness of the truck pad.

In one aspect, in combination with any example above or below, a second sensor of a camera sensor is focused on the first contact surface, wherein the second sensor is signaled to capture of an image of the first contact surface while the levered landing gear is in an extended position and correlate the image with the pad thickness measured by the thickness sensor.

In a further embodiment, the present disclosure provides a method for monitoring the health of a levered landing gear, comprising: calibrating a sensor for measuring a condition of a stop joint formed by a first stop pad and a second stop pad of the levered landing gear against a nominal condition of at least one of the first stop pad and the second stop pad; monitoring, by the sensor, a current condition of the at least one of the first stop pad and the second stop pad from the nominal condition; determining whether a non-conformance from the nominal condition of the at least one of the first stop pad and the second stop pad has been detected by the sensor for the current condition; and in response to determining that the non-conformance has been detected, generating an alert.

In one aspect, in combination with any example above or below, monitoring the health of a levered landing gear further comprises, in response to determining that the non-conformance has been detected: capturing an image via a camera focused on the at least one of the first stop pad and the second stop pad; storing the image for retrieval to corroborate the determination that the non-conformance has been detected; and displaying the image to a user in response to the user acknowledging the alert.

In one aspect, in combination with any example above or below, the condition monitored includes at least one of: a thickness of the second stop pad measured by the sensor via ultrasound; a gap distance between the first surface and the second surface measured by the sensor via an eddy current; a gap distance between the first surface and the second surface measured by the sensor via range finding; a visual indication of debris in the stop joint measured by the sensor via image recognition; a visual indication of corrosion in the stop joint measured by the sensor via image recognition; and a visual indication of surface marring in the stop joint measured by the sensor via image recognition.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

The present disclosure relates to apparatuses and methods that facilitate the maintenance of levered landing gears by monitoring the condition of the stop pads of such landing gears. An aircraft with levered landing gear employs the landing gear in an extended position to give additional height to the landing gear compared to the static position to thereby affect the angles of attack possible during takeoff and/or landing. While that aircraft is on the ground (e.g., resting, taxiing), the levered landing gear of the aircraft are in a static position in which the stop pads that support the weight of the aircraft are subject to various static, dynamic, and impact loads. The contacting surfaces of the stop pads, as well as other portions of the stop pads, are not visible while in the static position, which prevents maintenance and service personnel from inspecting the stop pads. To inspect the stop pads, the aircraft must be lifted off of its landing gear so that the levered landing gear may travel to an extended position in which the stop pads are visible. As will be appreciated, lifting an aircraft takes the aircraft out of service for a significant period of time, and thus can be very costly to the operators of the aircraft.

To reduce the costs associated with employing levered landing gears and the servicing thereof, the stop pads are often inspected on a scheduled basis (allowing the downtime to be predictable and co-scheduled with other maintenance) and are made of robust materials to extend the life of the stop pads past the scheduled maintenance periods. As will be appreciated, scheduled maintenance may result in premature replacement of parts, such as a pad with a five-year operation life but a three-year inspection schedule being replaced after only three years of operation. As will also be appreciated, the reliance on scheduled maintenance can lead to over-engineered parts being used, which increase the cost of the landing gear and result in heavier landing gear assemblies (affecting cost of the aircraft and the fuel efficiency of the aircraft in turn).

The present disclosure presents systems and methods to inspect the stop pads outside of the scheduled maintenance periods, thus enabling conditional maintenance to be performed in addition to the scheduled inspection and/or servicing of the levered landing gears. Various sensors are included in the stops pads and the levered landing gear assemblies that monitor the health of the stop pads and alert maintenance personnel when a non-conformance from the operational profile of the stop pad is noticed. Depending on the sensors used, non-conformances include the thicknesses of the pads, the surface conditions of the pads, whether the paired stop pads are making consistent contact with one another, and whether debris is present on the pads.

Figure 1A:
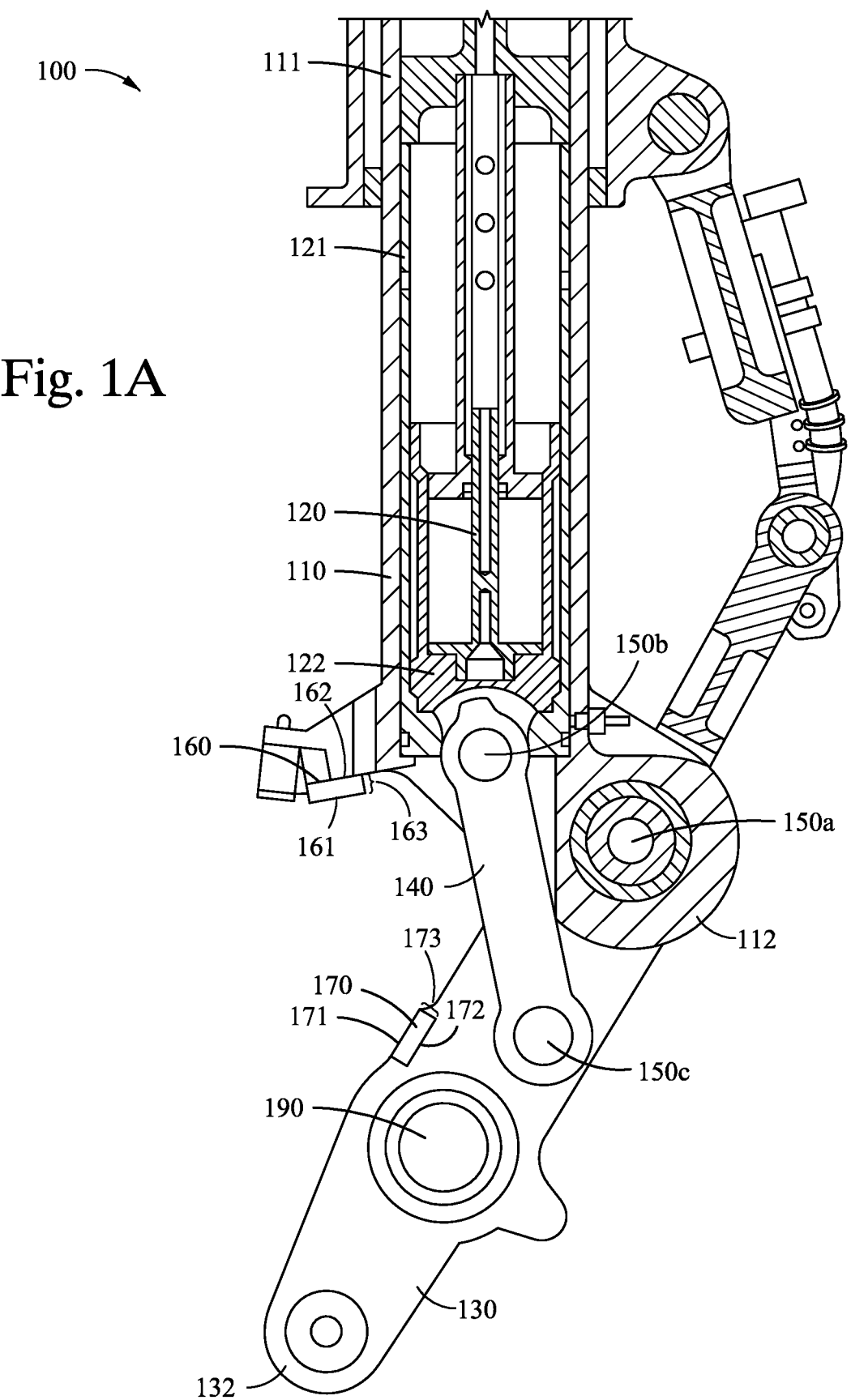
FIGS. 1A-C illustrate various views of an example levered landing gear according to embodiments of the present disclosure.
Figure 1B:
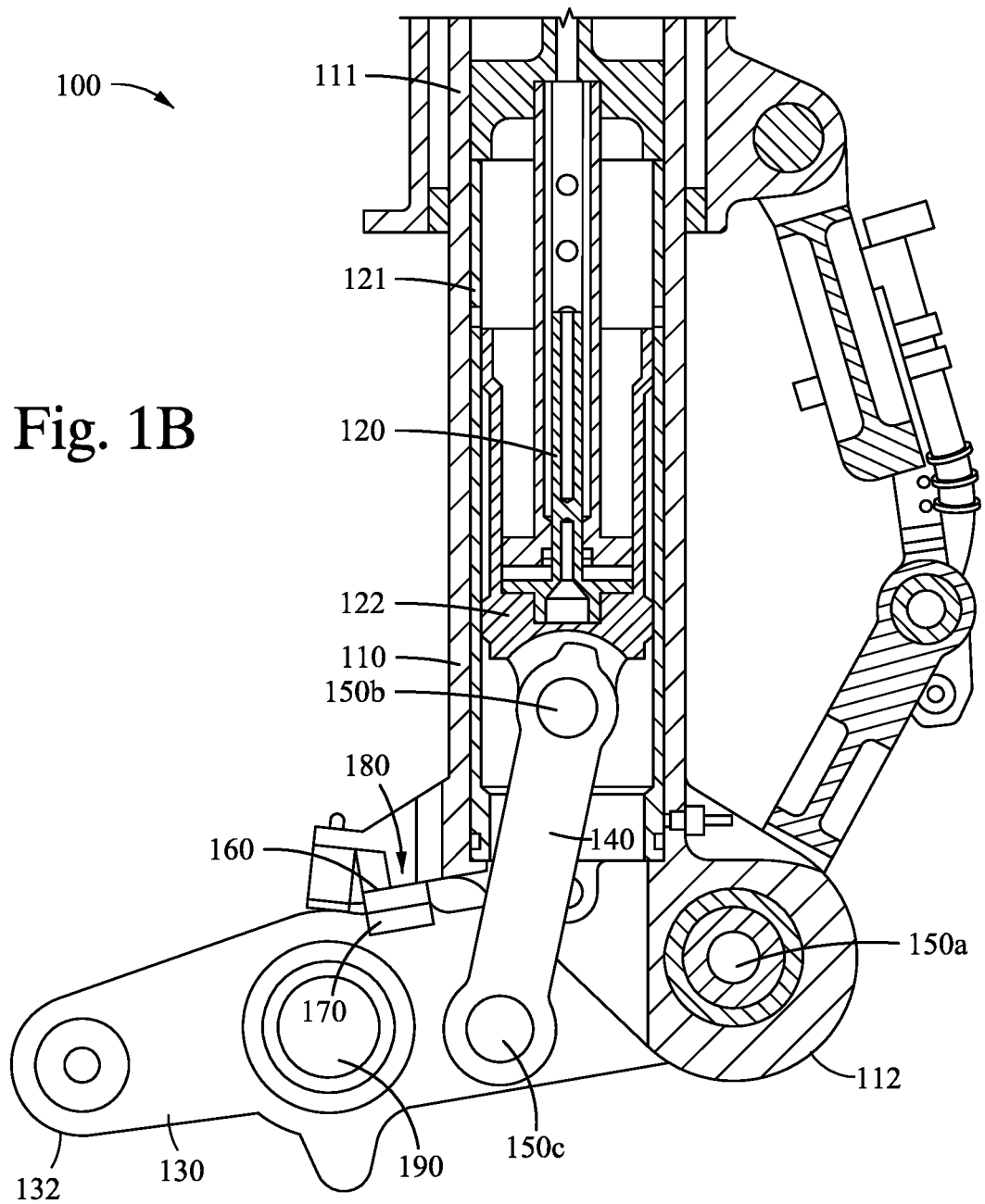
Figure 1C:
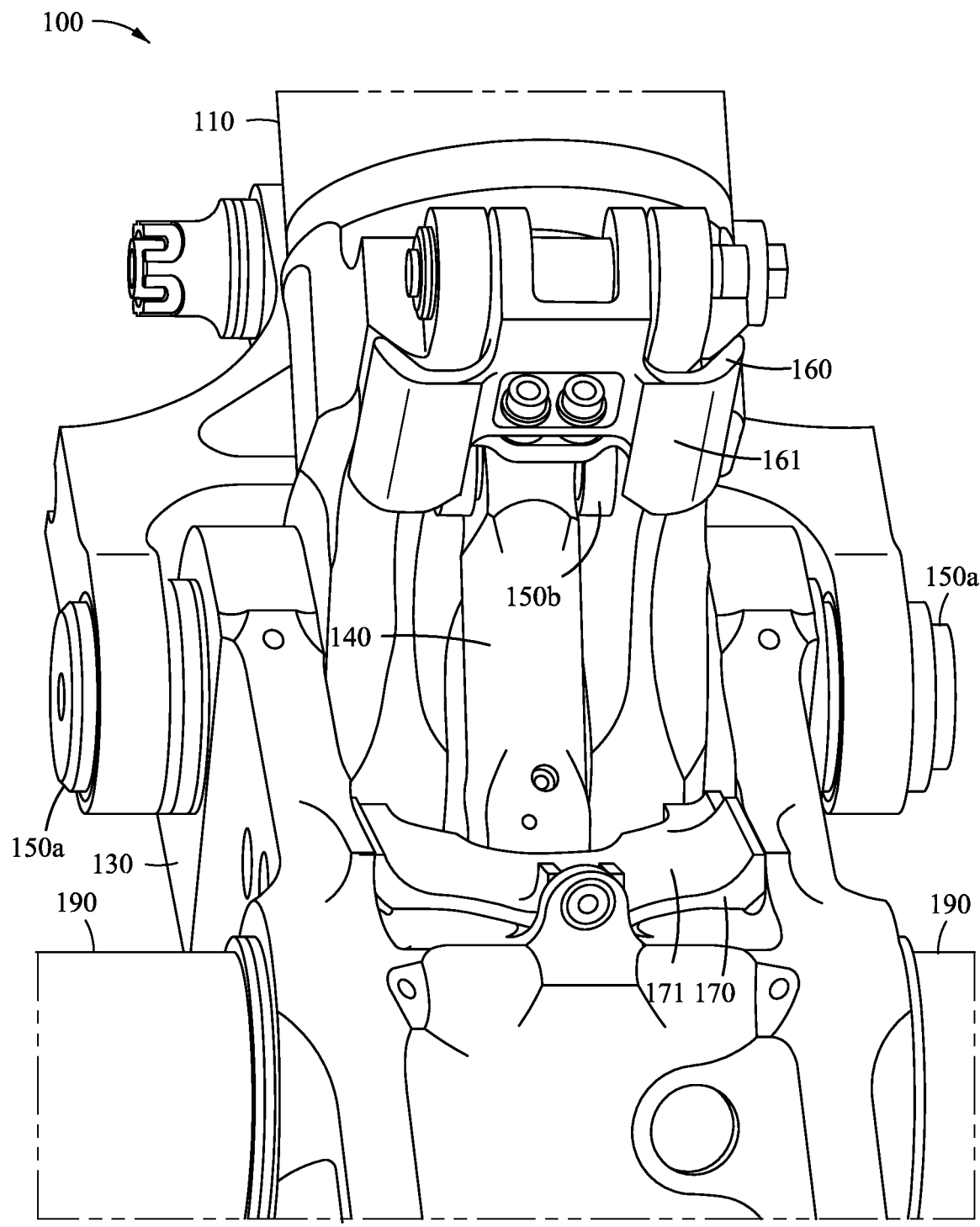

FIGS. 1A-C illustrate various views of an example levered landing gear 100 to highlight the operation of the stop pads that will be monitored according to embodiments of the present disclosure. FIG. 1A illustrates a lateral cutaway view of an example levered landing gear 100 in the extended position, while FIG. 1B illustrates a lateral cutaway view of that example levered landing gear 100 in the static position. FIG. 1C illustrates an isometric view of an example levered landing gear 100 in the extended position. Depending on the view presented, a given component may be fully or partially obscured by another component. Therefore, one or more portions of a given component may be labeled with the same reference number for ease in identifying a given component in the illustrated views. Multiple instances of a given component are differentiated from one another by the use of a letter in conjunction with the reference number. One of ordinary skill in the art will appreciate that the illustrations provide a set of non-limiting examples of some of the various shapes, dimensions, and arrangements possible for a levered landing gear 100 and its components.

For ease of understanding, the current disclosure focuses its explanation of a first shock strut 110, a second shock strut 120, a truck lever 130, a connecting link 140, a pivot joint 150, a strut pad 160, a truck pad 170, the stop joint 180 formed by the strut pad 160 and the truck pad 170, a landing gear axle 190, and various sensors for use with the levered landing gear, although one of ordinary skill in the art will appreciate that additional components are included in a levered landing gear 100 that are not discussed in detail herein. Collectively, the strut pad 160 and the truck pad 170 may be referred to as "stop pads," and either the strut pad 160 or the truck pad 170 may be referred to as a "first" stop pad and the other referred to as a "second" stop pad. Similarly, the various features of the stop pads may be referred to by the ordinal designators used with the associated stop pad, such as, for example, a "first contact surface" referring to the contact surface of the first stop pad (either the strut pad 160 or the truck pad 170).

The first shock strut 110 has a longitudinal axis having a first end 111, which connects with the aircraft, and a second end 112, which pivotally connects with the truck lever 130 via a first pivot joint 150a. The first shock strut 110, at or near the second end 112, includes the strut pad 160, which has a contact surface 161. Additional reference will be made to a mounted surface 162 of the strut pad 160, which is in contact with the body of the first shock strut 110, and is not visible in certain illustrations of the embodiments. Similarly, a strut pad thickness 163 is defined by the distance between the contact surface 161 and the mounted surface 162. In various embodiments, the strut pad 160 and the surrounding structure of the first shock strut 110 define one or more cavities in which various sensors are disposed. In some embodiments, the various sensors extend through the strut pad 160 or are associated with a through-hole in the contact surface 161.

The second shock strut 120 is disposed concentrically with the first shock strut 110, and shares a longitudinal axis with the first shock strut 110. A first end 121 of the second shock strut 120 is located within a cavity defined by the first shock strut 110, and the position of the first end 121 of the second shock strut 120 will vary as the second shock strut 120 extends to and from the extended position and the static position along the longitudinal axis shared with the first shock strut 110. The second end 122 of the second shock strut 120 is coupled to the truck lever 130 via a connection link 140. The connection link 140 is connected with the second shock strut 120 via a second pivot joint 150b and is connected with the truck lever 130 via a third pivot joint 150c.

The truck lever 130 is coupled to the first shock strut 110 and the second shock strut 120 such that the second shock strut 120, as it extends to and from the extended and static positions, pivots the truck lever 130 relative to the first shock strut 110. The truck lever is coupled at a first end 131 with the first shock strut 110 via the first pivot joint 150a and is coupled at a second end 132 with a landing gear axle 190, by which the wheels may be mounted with the levered landing gear 100.

The truck lever 130 includes the truck pad 170, which has a contact surface 171, configured to interface with the contact surface 161 of the strut pad 160 and thereby form the stop joint 180 when the truck lever 130 is in the static position. Additional reference will be made to a mounted surface 172 of the truck pad 170, which is in contact with the body of the truck lever 130, and is not visible in certain illustrations of the embodiments.

The various sensors used in one or more embodiments of the present disclosure are disposed with the levered landing gear 100 at various positions to measure conditions of the stop joint 180 to ensure the health of the mechanical components of the levered landing gear 100. The types of sensors; where those sensors are disposed of in the levered landing gear 100; the conditions of the stop joint 180 that are measured; whether a first sensor is used alone, part of a sensor array, or jointly with a second sensor; etc.; may vary in one or more embodiments of the present disclosure.

In various embodiments, the materials from which the strut pad 160 is constructed may be the same as or vary from the materials used for the first shock strut 110. Similarly, the materials from which the truck pad 170 is constructed may be the same as or vary from those materials used in the truck lever 130. In various embodiments, each of the strut pad 160 and the truck pad 170 are replaceable elements separable from the respective first shock strut 110 and the truck lever 130, although in some embodiments one or more of the strut pad 160 and the truck pad 170 may be designated regions of the first shock strut 110 or the truck lever 130, respectively. In some embodiments, the material that the strut pad 160 is made of is a harder material than the material than the truck pad 170 is made of, such as, for example, a steel versus a bronze (e.g., CuNiSn), so that wear can be observed more readily in one of the pads.

The stop joint 180 is formed by the strut pad 160 and the truck pad 170 when the landing gear 100 is in the static position. The contacting surfaces of the strut pad 160 and the truck pad 170 (e.g., the contact surface 161 and the contact surface 171) come into contact and help bear the weights and forces applied by the aircraft to the wheels. Over time, wear on the contacting surfaces will erode one or more of the strut pad 160 and the truck pad 170, contaminants may corrode one or more of the contact surfaces, and cracks, scratches, gouges, etc. may form. Additionally, various debris and contaminants may be introduced into the stop joint 180, which may damage the one or more of the strut pad 160 and the truck pad 170 if not removed.

In the extended position, a levered landing gear 100 provides additional height for the aircraft relative to the static position. As the second shock strut 120 extends, the connecting link 140 translates the vertical motion of the second shock strut 120 to pivot the truck lever 130 about the first pivot joint 150a. As shown in the illustrated embodiments, the third pivot joint 150c is located between the first pivot joint 150a and the landing gear axle 190 so that as the second shock strut 120 extends to the extended position, additional height is added to the levered landing gear 100. The amount of height added to the levered landing gear 100 roughly corresponds to the distance between the first pivot joint 150a and the landing gear axle 190. As the levered landing gear 100 extends to the extended position, the stop joint 180 opens, moving the strut pad 160 and the truck pad 170 away from one another and exposing the respective contact surfaces (i.e., contact surface 161 and the contact surface 171).

As will be appreciated, the contacting surfaces of the stop joint 180 are obscured by one another when the levered landing gear 100 is in the static position, rendering maintenance personnel unable to visually inspect the contact surface 161 of the strut pad 160 or the contact surface 171 of the truck pad 170. However, the levered landing gear 100 is not typically in the extended position, where the contact surfaces are visible, except during takeoff and landing. Therefore, for maintenance personnel to view the contact surfaces, the aircraft is lifted or jacked to remove its weight from the landing gear 100 so that the levered landing gear 100 may be placed in the extended position for visual inspection of the contact surfaces. These "lifting" or "jacking" operations are typically conducted on a scheduled basis (e.g., every X flight hours, every Y months) as the operations take the aircraft out of service for extended periods of time. The various sensors discussed in the present disclosure provide opportunities to evaluate the health of the stop joint 180 in addition to the scheduled maintenance inspections, and several example sensors are discussed in greater detail in regard to FIGS. 2-4.

Figure 2:
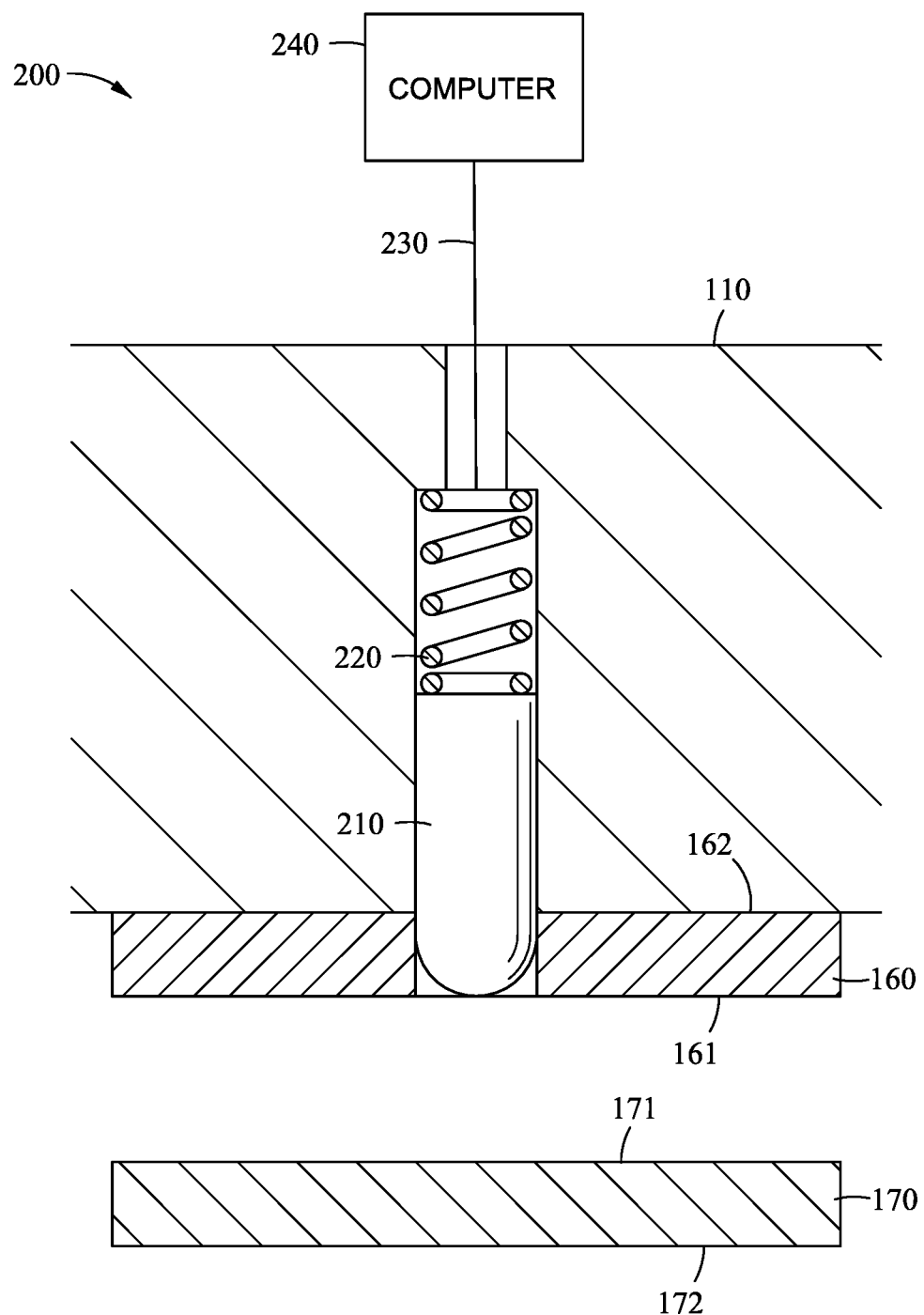
FIG. 2 illustrates a detailed view of a camera sensor integrated in an example levered landing gear according to embodiments of the present disclosure.

FIG. 2 illustrates a detailed view 200 of a camera sensor 210 integrated in an example levered landing gear 100 according to an embodiment of the present disclosure. A camera sensor 210 is focused on some or all of a contact surface of a stop pad and is configured or operable to measure a visual condition of a contact surface and/or to provide images of the contact surface to maintenance personnel to corroborate the findings of any other sensors in use in the levered landing gear 100. Although FIG. 2 illustrates one camera sensor 210 integrated in the strut pad 160 and the first shock strut 110, it will be appreciated that a camera sensor 210 may also be integrated in the truck pad 170 and the truck lever 130, or in a mount external to both the strut pad 160 and the truck pad 170, and that more than one camera sensor 210 may be employed in an array.

The camera sensor 210 includes a digital camera that is in communication with a computing device 240. In various embodiments, the camera sensor 210 receives power via camera cabling 230, which may also be used to communicate the images captured by the camera sensor 210 to the computing device 240. In other embodiments, the camera cabling 230 may also be used to communicate with an external computing device, such as a diagnostic terminal.

In various embodiments, the camera sensor 210 is a camera (or array of cameras) capable of capturing three-dimensional (3D) images, although two-dimensional (2D) camera sensor 210 may also be employed. The camera sensor 210 includes an appropriate lens to focus the camera sensor 210 on the desired portion or portions of the contact surfaces to monitor (e.g., a wide angle lens, a multi-focal lens). The camera sensor 210 is able to automatically focus, and thus is able to capture images of the contact surface at various stages of extension between the extended and static positions of the levered landing gear 100 as the contact surfaces approach or recede from one another. In some embodiments, the camera sensor 210 includes a light source that may be activated or deactivated to ensure a consistent light level in the images of the contact surfaces captured by the camera sensor 210.

The camera sensor 210 may be disposed of within one of the stop pads (to monitor the surface conditions of the other stop pad) or externally to the stop pads (to monitor the surface conditions of one or both stop pads).

When disposed internally to the stop pads, a cavity defined in the stop pad and/or the body of the associated shock strut holds the camera sensor 210 with its image capturing end facing outward. The shape and size of the camera sensor 210 relative to the cavity and/or an opening defined in the stop pad may capture the camera sensor 210 within the cavity so that the lens of the camera sensor 210 does not extend past the contacting surface of the stop pad that the camera sensor 210 is mounted within. To cushion the camera sensor 210 from impacts during aircraft operations (e.g., landing gear extension/retraction, takeoff, landing), one or more camera actuator members 220, such as springs, pistons, micro linear actuators, or the like, are connected with the camera sensor 210 within its housing.

When disposed externally to the stop pads, such as in a space between stop pads, the camera sensor 210 may be held in a fixed mount or a rotating mount. An external mount for the camera sensor 210 may also include springs to cushion the camera from impacts. When employing a rotating mount, the second shock strut 120 may be communicated to the camera sensor 210 to co-rotate or counter-rotate the camera relative to the truck lever 130 as the truck lever 130 rotates between the extended and static positions to maintain or establish a field of view that includes the monitored contacting surfaces.

The computing device 240 to which the camera sensor 210 is connected includes computer readable memory storage devices (e.g., hard drives, RAM (Random Access Memory), flash drives) and processors that execute logic stored on the memory storage devices, which may control various components of the aircraft or interface to control or diagnose various features of the camera sensor 210. For example, the computing device 240 may be the onboard computer for the aircraft or may be an external computer used by maintenance personnel that is connected to the camera sensor 210 during maintenance checks and/or pre-/post-flight checkups. The camera sensor 210 may also include computer readable memory storage devices and processors to control its capture and/or analysis of images, or may rely on the computing device 240 for control and/or storage.

In some embodiments, the camera sensor 210 stores one or more images captured during takeoff and/or landing (when the contact surfaces are visible) in an internal memory storage device or a memory storage device of the computing device 240. The camera sensor 210 may take images in response to a signal from the computer device 240 indicating that the second shock strut 120 is moving the levered landing gear 100 into or out of the extended position, a timing signal (e.g., every X seconds, Y seconds after an event), or a signal from another sensor indicating that a non-conformance has been detected by that sensor.

The captured images may be retained for human inspection, or compared by the computing device 240 against a nominal state of the contact surface to generate alerts when a non-conformance is visually detected. For example, maintenance personnel may manually check the captured images to determine whether maintenance should be performed on the levered landing gear 100. In another example, an artificial intelligence (AI) or computer learning algorithm may be employed by the computing device 240 to learn when a human or another sensor would indicate a non-conformance, and generate alerts based on the learned visual appearances of non-conformances. In a further example, various image thresholds may be used against the captured images, such as, for example, a color or albedo threshold for the image that indicates a percentage of the image that must be within a predetermined range of a nominal color or albedo to alert when a patina has been removed (e.g., via a scratch or pitting revealing a differently colored/reflective substrate), a contaminant/debris has been introduced (e.g., replacing the expected color or reflectiveness with the contaminant's color/reflectiveness), or corrosion is occurring.

Figure 3:
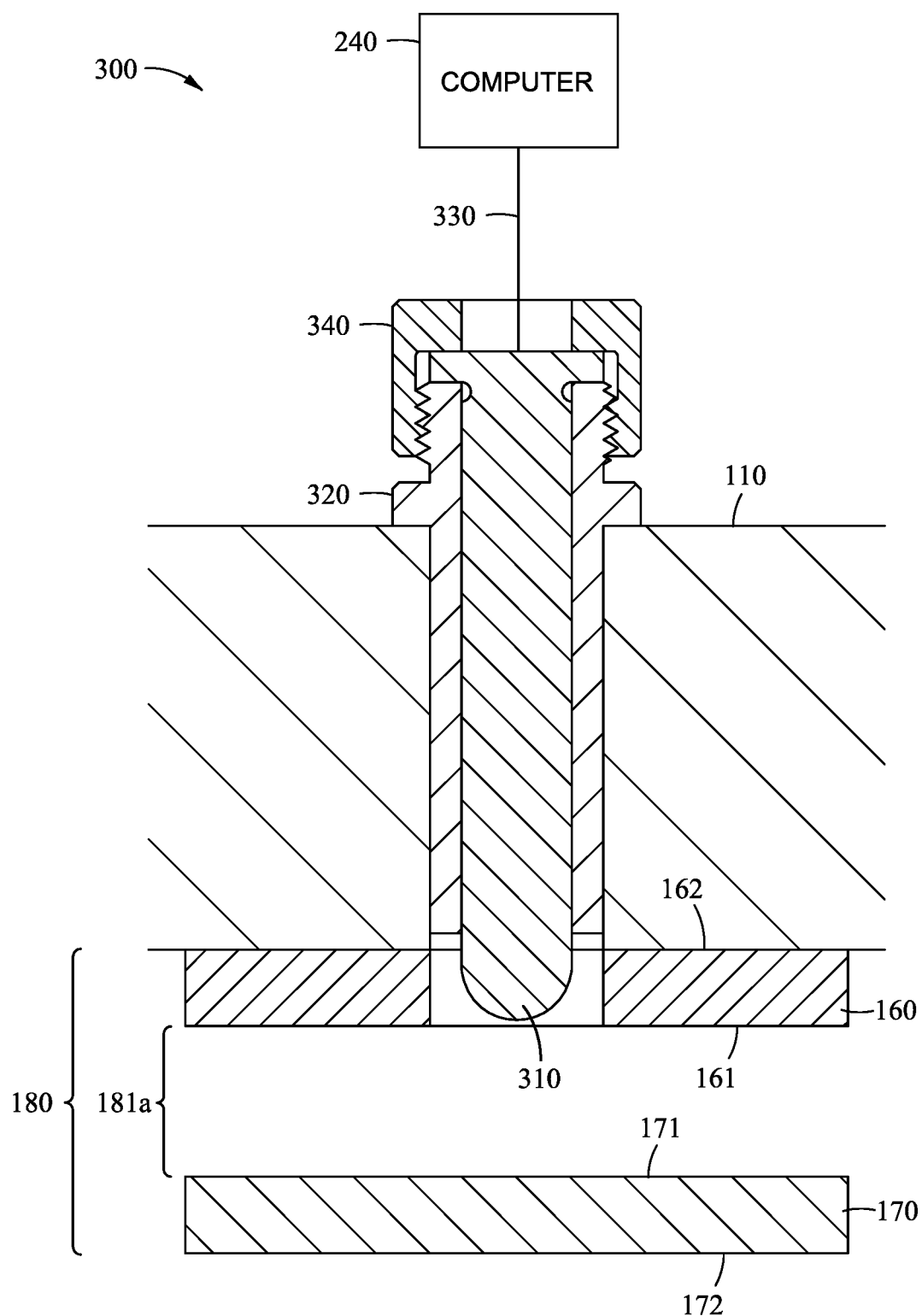
FIG. 3 illustrates a detailed view of a gap sensor integrated in an example levered landing gear according to embodiments of the present disclosure.

FIG. 3 illustrates a detailed view 300 of a gap sensor 310 integrated in an example levered landing gear 110 according to an embodiment of the present disclosure. Although FIG. 3 illustrates one gap sensor 310 integrated in the strut pad 160 and the first shock strut 110, it will be appreciated that a gap sensor 310 may also be integrated in the truck pad 170 and the truck lever 130, and that more than one gap sensor 310 may be employed in an array. When employed in an array, each gap sensor 310 of the array may measure a localized portion of the gap distance 181 in the stop joint 180 or may be combined to measure the gap distance 181 as an average across several locations.

In various embodiments, the gap sensor 310 includes one or more of an eddy current sensor or a range finder to determine a gap distance 181 in the stop joint 180 between the gap sensor 310 and the opposing stop pad's contact surface. The gap sensor 310 is disposed of within the stop pad and surrounding substrate via a bushing 320 at a calibrated distance from an opposing stop pad, and communicated with the computing device 240 via a gap cable 330. The bushing 320 and an associated locking nut 340 hold the gap sensor 310 in a stable position relative to the nominal position of the contact surfaces so that as the stop pads wear or erode, or as cracks or debris are introduced that alter the measured gap distance 181, the change will be noted.

For example, when a through-hole in the strut pad 160 includes a gap sensor 310, the distance from the measurement point of the gap sensor 310 and the truck pad 170 (i.e., the opposing stop pad in this example) is calibrated for the nominal gap distance 181 when the stop pads form the stop joint 180. The measured distances between the gap sensor 310 and the truck pad 170 are compared against a gap threshold, either by the gap sensor 310 or the computing device 240 to which the gap sensor 310 communicates its measurements, so that an alert is generated when the distance of the gap distance satisfies the gap threshold. In various embodiments, the gap threshold specifies a range (positive and negative relative to the nominal gap distance) that the gap distance may vary before an alert is generated.

When the gap sensor 310 is an eddy current sensor or other inductive sensor, an alternating current energizes the gap sensor 310, which induces eddy current into the surrounding materials of one or more of the stop pads. These eddy currents, in turn, affect an impedance within the gap sensor 310 that is measured to determine a corresponding gap distance 181 between the gap sensor 310 and the opposing contact surface.

When the gap sensor 310 is a range finder, the gap sensor 310 generates a ranging signal when activated, and measures a time for the ranging signal to be reflected back to the range finder. Examples of range finders include laser range finders and acoustic range finders (e.g., sonar, ultrasound) to determine the return times of the ranging signal (e.g., a laser or soundwave) through the speed of the ranging signal through the material forming the gap (e.g., air).

As will be appreciated, as material expand and contract due to changes in temperature, the temperature of the stop pads and the gap sensor 310 may affect the measured gap distance. In various embodiments, the computing device 240 will apply a temperature offset to the measured distances reported by the gap sensor 310 or alter the gap threshold to account for changes in temperature that will affect proper alerting (reducing false positives and false negatives). In other aspects, the gap sensor 310 includes temperature compensations so that as the temperature of the gap sensor 310 and stop pads change, the reported change in gap distance 181 will be compensated for.

Figure 4:
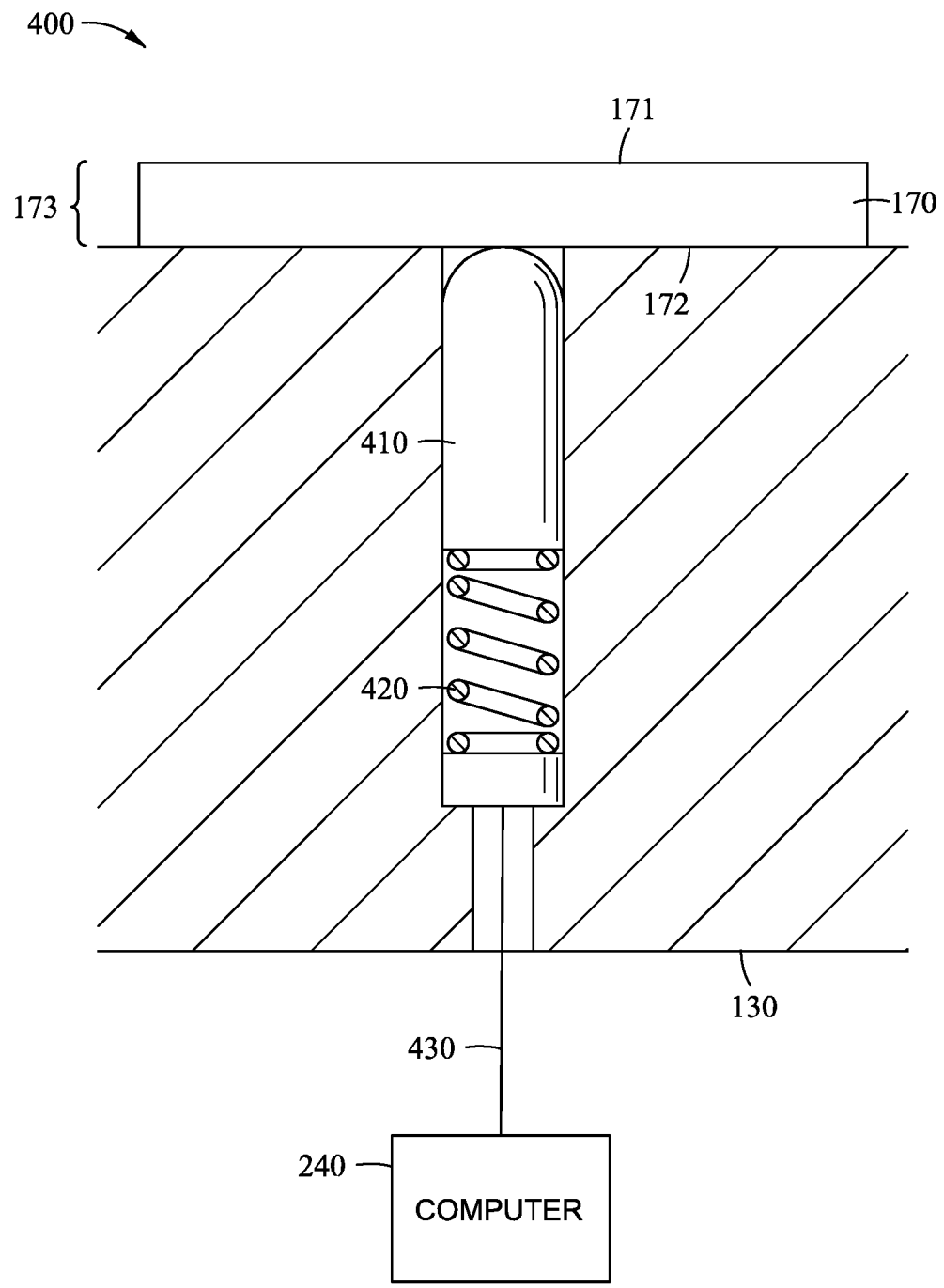
FIG. 4 illustrates a detailed view of a thickness sensor integrated in an example levered landing gear according to embodiments of the present disclosure.

FIG. 4 illustrates a detailed view 400 of a thickness sensor 410 integrated in an example levered landing gear 100 according to embodiments of the present disclosure. Although FIG. 4 illustrates one camera sensor 210 integrated in the truck pad 170 and the truck lever 130, it will be appreciated that a thickness sensor 410 may also be integrated in the strut pad 160 and the first shock strut 110, and that more than one thickness sensor 410 may be employed in an array. When employed in an array, each thickness sensor 410 may measure a localized portion of an associated stop pad or may be combined to measure the thickness as an average across several locations.

In some embodiments, the thickness sensor 410 is an ultrasound sensor that measures the thickness of the associated stop pad by generating ultrasonic sound waves that are transmitted into the mounted surface of the stop pad and measuring a time that it takes for the sound waves to reflect from the contact surface back to the thickness sensor 410.

The thickness sensor 410 is disposed internally to the stop pads, in a cavity defined in the body of the truck lever 130 when associated with the truck pad 170 or in the body of the first shock strut 110 when associated with the strut pad 160. The thickness sensor 410 is held in contact with the stop pad via a thickness actuator member 420, such as a spring, piston, micro linear actuator, or the like, which also serves to cushion the thickness sensor 410 from impacts during aircraft operations (e.g., landing gear extension/retraction, takeoff, landing). Measurements of the pad thickness are transmitted to the computing device 240 via the thickness cable 430, which may also supply power for the thickness sensor 410.

For example, when the truck pad 170 includes a thickness sensor 410, the thickness sensor 410 is calibrated for the nominal pad thickness 173. As the truck pad 170 is used, wear and tear on the pad will erode the thickness thereof. Additionally, if any cracks or pitting develop in the truck pad 170, the localized thickness will be lowered from the nominal pad thickness 173. Moreover, if the truck pad 170 is overly compressed or develops a patina, localized portions of the truck pad 170 may exceed the nominal pad thickness 173. The measured pad thicknesses 173 are compared against a thickness threshold, either by the thickness sensor 410 or the computing device 240 to which the thickness sensor 410 communicates its measurements, so that an alert is generated when the pad thickness satisfies the thickness threshold. In various embodiments, the thickness threshold specifies a range (positive and negative relative to the nominal gap distance) that the pad thickness may vary before an alert is generated.

For example, when employed to measure the thickness of the truck pad 170, the thickness sensor 410 is held in contact with the second mounted surface 172 of the truck pad 170 by the thickness actuator member 420. The thickness sensor 410 measures a pad thickness 173 of the truck pad 170, defined by the distance between the mounted surface 172 and the contact surface 171.

The thickness sensor 410 may measure the pad thickness when the levered landing gear 100 is in the extended position or on the static position. As will be appreciated, as the temperature of the truck pad 170 (or the strut pad 160 if a thickness sensor 410 is employed therewith) changes, the thickness or the acoustic properties (e.g. the speed at which sound travels through the material) of the stop pad may change. In various embodiments, the computing device 240 will apply a temperature offset to the measured pad thickness reported by the thickness sensor 410 or alter the thickness threshold to account for changes in temperature that will affect proper alerting (reducing false positives and false negatives). In other aspects, the thickness sensor 410 includes temperature compensations so that as the temperature of the thickness sensor 410 and stop pads change, the reported change in pad thickness will be compensated for when reported to the computing device 240.

Figure 5:
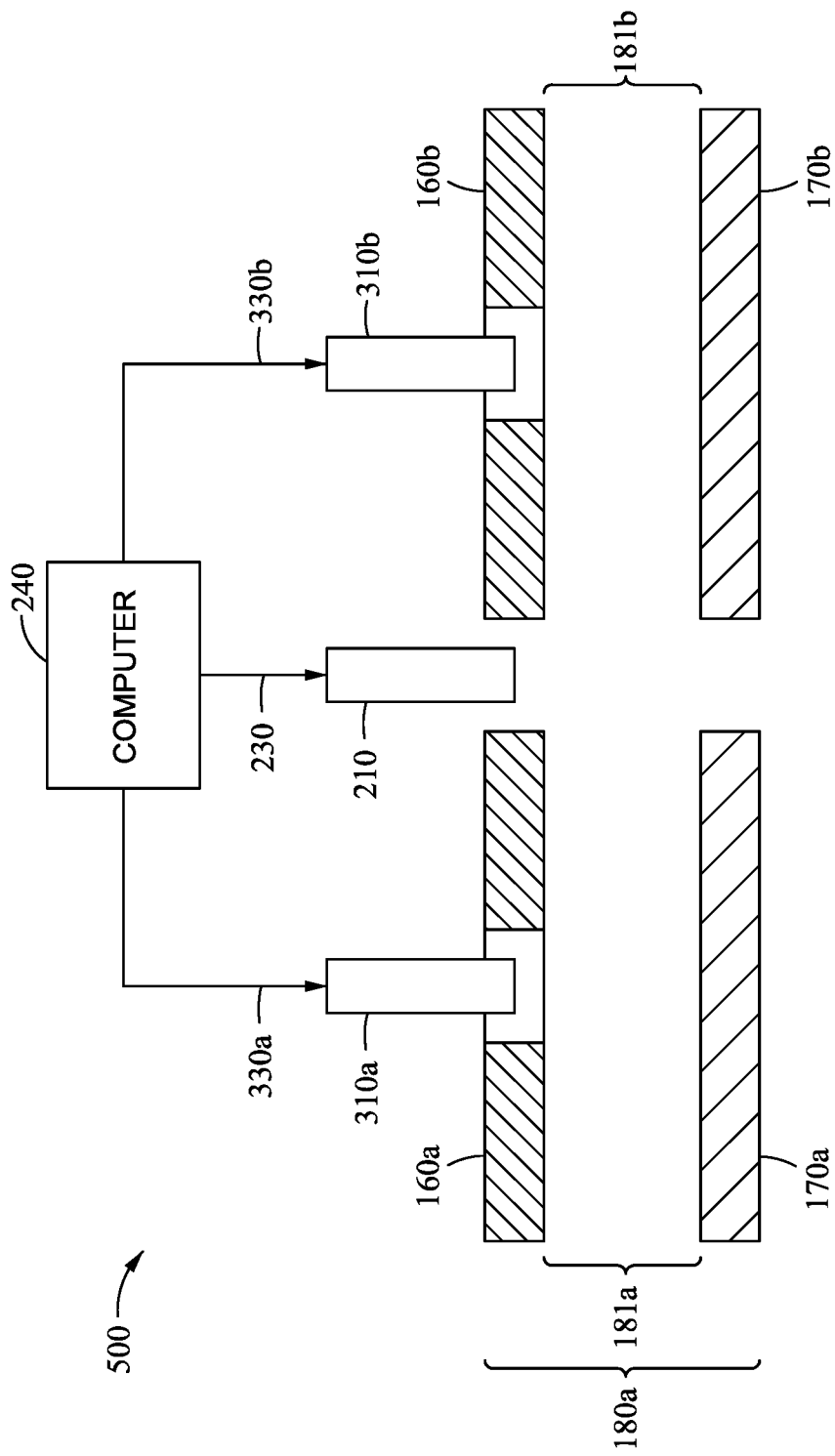
FIG. 5 illustrates an example deployment of a single camera sensor and multiple gap sensors integrated in an example levered landing gear according to an embodiment of the present disclosure.

FIG. 5 illustrates an example deployment 500 of a single camera sensor 210 and multiple gap sensors 310 integrated in an example levered landing gear 110 according to an embodiment of the present disclosure. As will be appreciated, the example deployment 500 is provided as a non-limiting example of the present disclosure, and embodiments with more, fewer, or different components that may be arranged in different positions are contemplated.

In the example deployment 500, a first gap sensor 310a and a second gap sensor 310b are disposed of in a first strut pad 160a and a second strut pad 160b, respectively. The first gap sensor 310a measures a distance to a first truck pad 170a as a first gap distance 181a, and the second gap sensor 310b measures a distance to a second truck pad 170b as a second gap distance 181b. As will be appreciated, each of the first strut pad 160a, the second strut pad 160b, the first truck pad 170a, and the second truck pad 170b may be individual stop pads that are separately replaceable, or may be localized portions of a single respective strut pad 160 or truck pad 170.

Both the first gap sensor 310a and the second gap sensor 310b are communicated to a computing device 240 via a respective first gap cable 330a and a second gap cable 330b. The computing device 240 receives the measured gap distances 181 from the gap sensors 310, and may compare the measured gap distances 181 individually or collectively against one or more gap thresholds. For example, the computing device 240 may average the readings received from the several gaps sensors 310 for comparison against an average gap threshold and also compare the individual readings received from specific gap sensors 310 against localized gap thresholds.

In addition to the gap sensors 310, a camera sensor 210 is included in the example deployment 500, which faces the truck pads 170 and is connected with the computing device 240 via a camera cable 230. In various embodiments the camera sensor 210 is disposed of within the strut pad 160, between individual strut pads 160 (e.g., a first strut pad 160a and a second strut pad 160b), or on the first shock strut 110 separately from the stop pads. The camera sensor 210 may include a wide angle lens to focus on both truck pads 170 simultaneously, a movable lens to focus on the first truck pad 170a and the second truck pad 170b at different times.

The computing device 240 may signal one or more of the sensors to take measurements at specific times, in response to specific conditions, or may sample measurements when specific conditions are true. For example, the computing device 240 may signal the gap sensors 310 to take readings of the gap distances 181 when the levered landing gear 100 enters the static position and every X seconds thereafter. In another example, the computing device 240 may signal the camera sensor 210 to capture images in response to the gap sensors 310 indicating a gap distance 181 that is out of conformance once the levered landing gear 100 transitions to an extended position. In a further example, the gap sensors 310 may take constant measurements, and the computing device 240 may ignore or discard data while the levered landing gear 100 is in the extended position. In another example, the camera sensor 210 captures several images while the levered landing gear 100 is in the extended position, and the computing device 240 determines whether to retain those images based on whether the gap sensors 310 indicate that the gap distance 181 is out of conformance when the levered landing gear 100 next returns to the static position.

Figure 6:
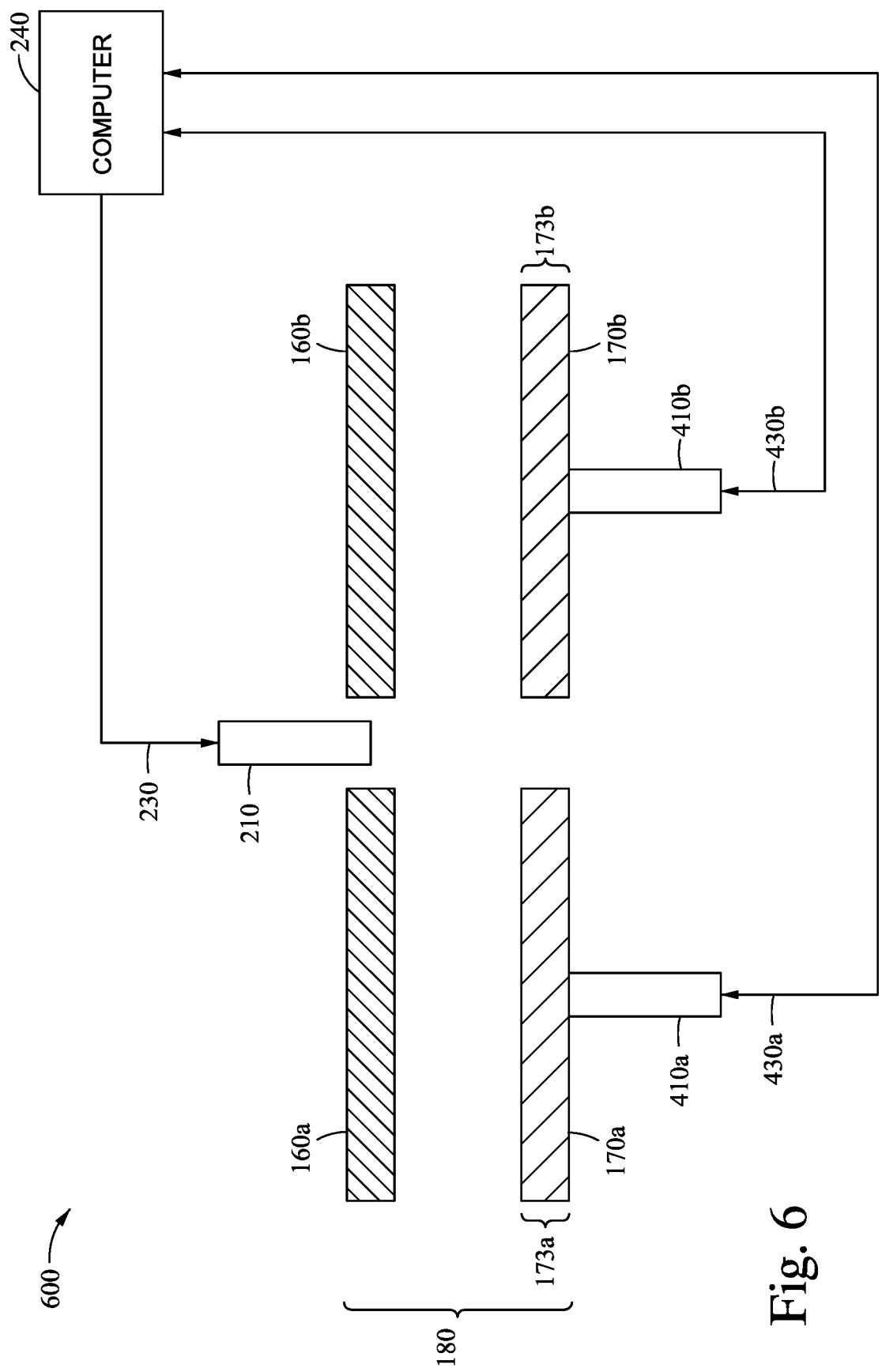
FIG. 6 illustrates an example deployment of a single camera sensor and multiple thickness sensors integrated in an example levered landing gear according to an embodiment of the present disclosure.

FIG. 6 illustrates an example deployment 600 of a single camera sensor 210 and multiple thickness sensors 410 integrated in an example levered landing gear 110 according to an embodiment of the present disclosure. As will be appreciated, the example deployment 600 is provided as a non-limiting example of the present disclosure, and embodiments with more, fewer, or different components that may be arranged in different positions are contemplated.

In the example deployment 600, a first thickness sensor 410a and a second thickness sensor 410b are disposed of in a first truck pad 170a and a second truck pad 170b, respectively. The first thickness sensor 410a measures a thickness of the first truck pad 170a as a first pad thickness distance 173a, and the second thickness sensor 410b measures a thickness of a second truck pad 170b as a second thickness 173b. As will be appreciated, each of the first strut pad 160a, the second strut pad 160b, the first truck pad 170a, and the second truck pad 170b may be individual stop pads that are separately replaceable, or may be localized portions of a single respective strut pad 160 or truck pad 170.

Both the first thickness sensor 410a and the second thickness sensor 410b are communicated to a computing device 240 via a respective first thickness cable 430a and a second thickness cable 430b. The computing device 240 receives the measured thicknesses distances 173 from the thickness sensors 410, and may compare the measured thicknesses 173 individually or collectively against one or more thickness thresholds. For example, the computing device 240 may average the readings received from the several thickness sensors 410 for comparison against an average thickness threshold and also compare the individual readings received from specific thickness sensors 410 against localized thickness thresholds.

In addition to the thickness sensors 410, a camera sensor 210 is included in the example deployment 600, which faces the truck pads 170 and is connected with the computing device 240 via a camera cable 230. In various embodiments the camera sensor 210 is disposed of within the strut pad 160, between individual strut pads 160 (e.g., a first strut pad 160*a* and a second strut pad 160*b*), or on the first shock strut 110 separately from the stop pads. The camera sensor 210 may include a wide angle lens to focus on both truck pads 170 simultaneously, a movable lens to focus on the first truck pad 170*a* and the second truck pad 170*b* at different times.

The computing device 240 may signal one or more of the sensors to take measurements at specific times, in response to specific conditions, or may sample measurements when specific conditions are true. For example, the computing device 240 may signal the thickness sensors 410 to take readings of the thicknesses 173 every X seconds. In another example, the computing device 240 may signal the camera sensor 210 to capture images in response to the thickness sensors 410 indicating a thickness 173 that is out of conformance once the levered landing gear 100 transitions to an extended position. In a further example, the thickness sensors 410 may take constant measurements, and the computing device 240 may sample those measurements every X seconds. In another example, the camera sensor 210 captures several images while the levered landing gear 100 is in the extended position, and the computing device 240 determines whether to retain those images based on whether the thickness sensors 410 indicate that the thickness 173 is out of conformance.

Figure 7:
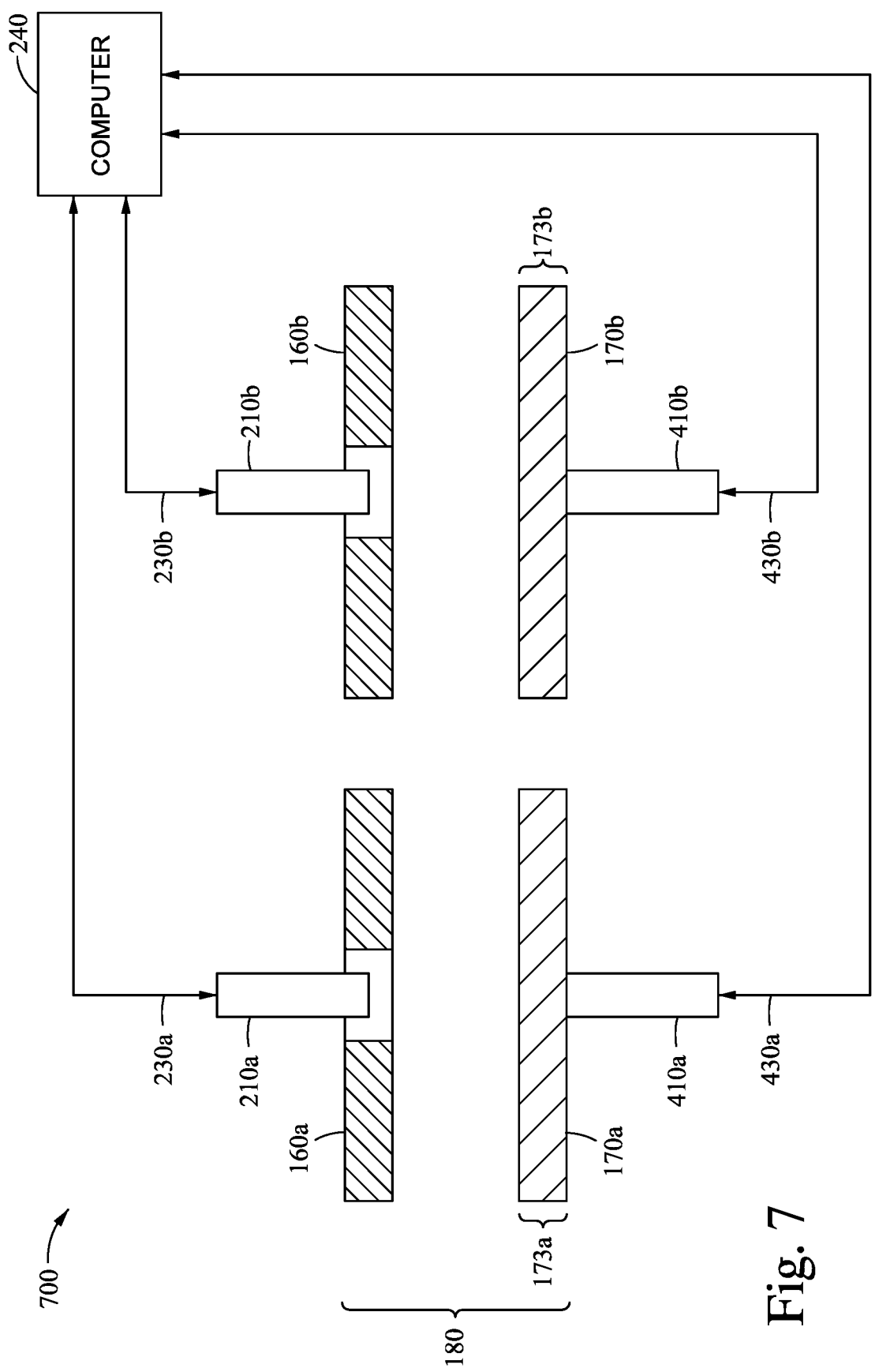
FIG. 7 illustrates an example deployment of multiple camera sensors and multiple thickness sensors integrated in an example levered landing gear according to an embodiment of the present disclosure.

FIG. 7 illustrates an example deployment 700 of multiple camera sensors 210 and multiple thickness sensors 410 integrated in an example levered landing gear 110 according to an embodiment of the present disclosure. As will be appreciated, the example deployment 700 is provided as a non-limiting example of the present disclosure, and embodiments with more, fewer, or different components that may be arranged in different positions are contemplated.

In the example deployment 700, a first thickness sensor 410*a* and a second thickness sensor 410*b* are disposed of in a first truck pad 170*a* and a second truck pad 170*b*, respectively. The first thickness sensor 410*a* measures a thickness of the first truck pad 170*a* as a first pad thickness distance 173*a*, and the second thickness sensor 410*b* measures a thickness of a second truck pad 170*b* as a second thickness 173*b*. As will be appreciated, each of the first strut pad 160*a*, the second strut pad 160*b*, the first truck pad 170*a*, and the second truck pad 170*b* may be individual stop pads that are separately replaceable, or may be localized portions of a single respective strut pad 160 or truck pad 170.

Both the first thickness sensor 410*a* and the second thickness sensor 410*b* are communicated to a computing device 240 via a respective first thickness cable 430*a* and a second thickness cable 430*b*. The computing device 240 receives the measured thicknesses distances 173 from the thickness sensors 410, and may compare the measured thicknesses 173 individually or collectively against one or more thickness thresholds. For example, the computing device 240 may average the readings received from the several thickness sensors 410 for comparison against an average thickness threshold and also compare the individual readings received from specific thickness sensors 410 against localized thickness thresholds.

In addition to the thickness sensors 410, a first camera sensor 210*a* and a second camera sensor 210*b* are included in the example deployment 700, which faces the truck pads 170 and are connected with the computing device 240 via a first camera cable 230*a* and a second camera cable 230*b*, respectively. Each of the camera sensors 210 are disposed of in a respective first strut pad 160*a* and a second strut pad 160*b* and each camera sensor 210 may include a wide angle lens to focus on both truck pads 170 simultaneously, a movable lens to focus on the first truck pad 170*a* and the second truck pad 170*b* at different times, or may be focused on an individual truck pad 170. In embodiments where each camera sensor 210 is focused on both truck pads 170, the computing device may combine the received images to create a 3D composite view of the contact surfaces 171 of the truck pads 170.

The computing device 240 may signal one or more of the sensors to take measurements at specific times, in response to specific conditions, or may sample measurements when specific conditions are true. For example, the computing device 240 may signal the thickness sensors 410 to take readings of the thicknesses 173 every X seconds. In another example, the computing device 240 may signal the camera sensor 210 to capture images in response to the thickness sensors 410 indicating a thickness 173 that is out of conformance once the levered landing gear 100 transitions to an extended position. In a further example, the thickness sensors 410 may take constant measurements, and the computing device 240 may sample those measurements every X seconds. In another example, the camera sensor 210 captures several images while the levered landing gear 100 is in the extended position, and the computing device 240 determines whether to retain those images based on whether the thickness sensors 410 indicate that the thickness 173 is out of conformance.

Figure 8:
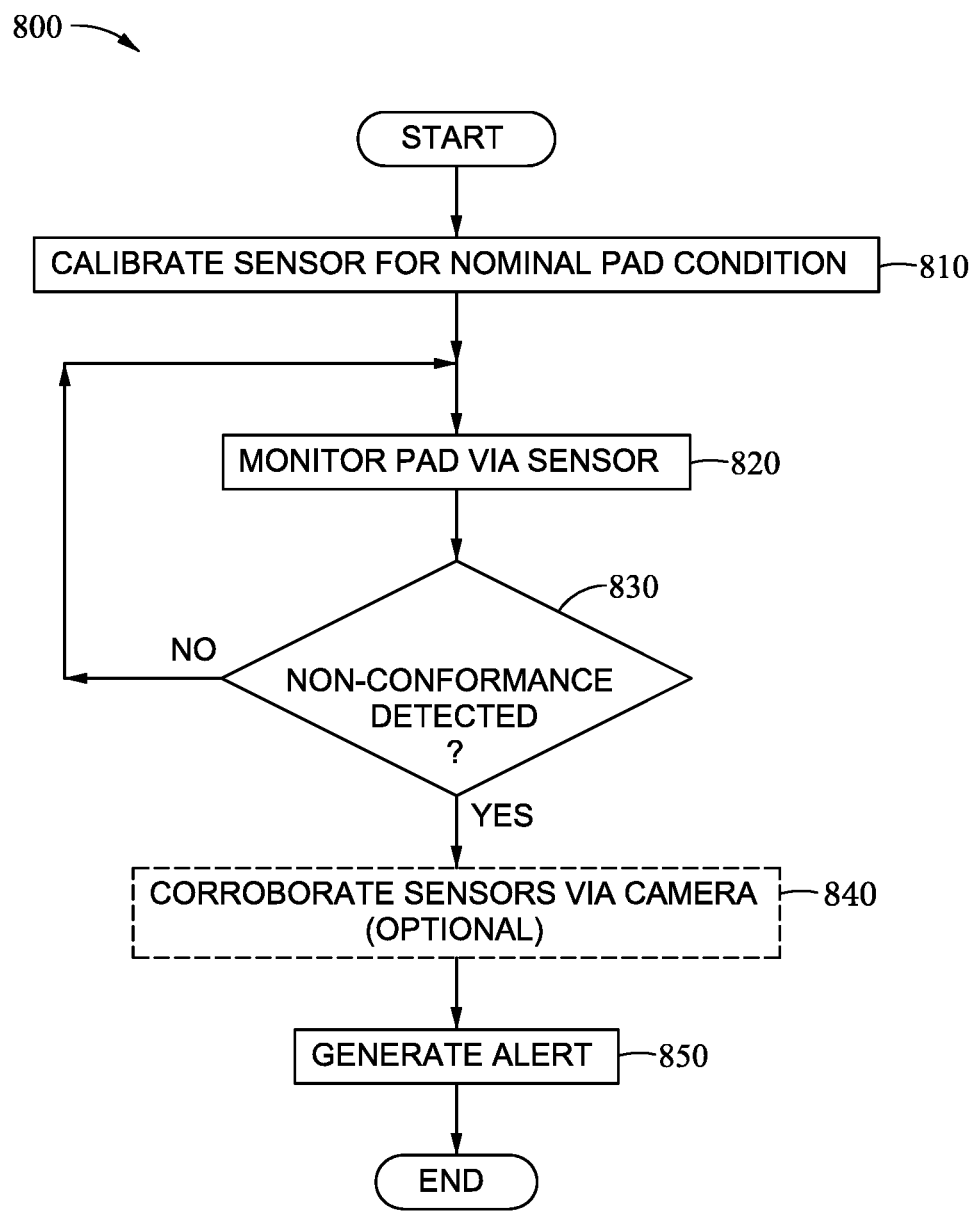
FIG. 8 is a flowchart illustrating the general steps in an example method for providing health monitoring of aircraft landing gear mechanical structures according to embodiments of the present disclosure.

FIG. 8 is a flowchart illustrating the general steps in an example method 800 for providing health monitoring of aircraft landing gear mechanical structures according to embodiments of the present disclosure. Method 800 begins at block 810, where one or more sensors are calibrated for the nominal stop pad conditions that they are designed to monitor. For example, when one or more stop pads are newly installed (replacing prior stop pads or at an initial installation) one or more of a camera sensor 210, gap sensor 310, and thickness sensor 410 are calibrated for an initial color/appearance, gap distance 181, and/or pad thickness. Calibration may involve adjusting the measurements produced by the sensors to match the nominal values, training a machine learning algorithm to detect aberrant conditions based on a supervised set of measurement data (e.g., prior known conforming and non-conforming measurements), and adjusting the various thresholds that the measured values are compared against.

At block 820 the stop pads are monitored by the calibrated sensors. In various embodiments, the sensors may periodically (e.g., every X seconds) take measurements of the stop pads, may take measurements in response to a user request for the signal, take measurements in response to a transition to or from the extended position, or may take measurements constantly. The camera sensors 210 (if included) capture images that are compared against nominal or initial image feature thresholds when the levered landing gear 100 is not in the static position. The gap sensors 310 (if included) take measurements of the gap distance 181 when the levered landing gear 100 is in the static position. The thickness sensors 410 (if included) take measurements of the thickness of an associated stop pad regardless of the position of the levered landing gear 100. As will be appreciated, the various measurements taken at block 820 may be measured across a period of time for a given sensor, across an array of sensors of a given type, or cross correlated between sensors/arrays of sensors of different types. For example, an image taken during landing by a camera sensor 210 may be correlated with the gap measurements taken by an array of gap sensors 310 prior to landing and/or after landing when the levered landing gear 100 is again in the static position.

Proceeding to block 830, it is determined, based on the measurements and the associated thresholds, whether a non-conformance in the stop joint 180 has been detected. A non-conformance is determined to have been detected in response to a measurement from a sensor satisfying an associated threshold. For example, a thickness measured above an upper thickness threshold or measured below a lower thickness threshold may be determined to satisfy a thickness threshold. In another example, gap distance measured above an upper gap threshold or measured below a lower gap threshold may be determined to satisfy a gap threshold. In a further example, a color or albedo of a captured image is compared against a color or albedo threshold, and an image that has a calculated color or albedo outside of the color or albedo threshold is determined to satisfy that threshold. In an additional example, a confidence of an image recognition system (using a calibrated AI or a machine learning algorithm) that a non-conformance such as debris or damage to the contact surfaces is present is compared against a confidence threshold such that when the confidence exceeds the confidence threshold it is determined that the threshold has been satisfied.

In response to determining that a non-conformance has not been detected, method 800 returns to block 820. In response to determining that a non-conformance has been detected, method 800 optionally proceeds to block 840 and then to block 850. In some embodiments, method 800 continues performing blocks 820 and 830 once a non-conformance has been detected to determine whether the non-conformance is transient, spreading, or can be verified by additional sensors.

Optionally, at block 840, camera sensor 210 is used to corroborate the detected non-conformance. As will be appreciated, method 800 may forego block 840 in embodiments that do not include a camera sensor 210 or when the non-conformance is detected after the levered landing gear 100 has entered the static position. The camera sensor 210 is signaled to capture an image of the stop pads that is associated with the detected non-conformance so that maintenance personnel may verify the presence of the indicated non-conformance and/or so that an image recognition system may be trained to identify non-conformances from images of the contact surfaces. The captured image is then stored in the camera sensor 210 and/or the computing device 240 for retrieval to corroborate the determination that the non-conformance has been detected.

At block 850 an alert is generated in response to the detected non-conformance. In various embodiments, the alert is generated and/or displayed by the computing device 240. When block 840 is performed, the alert may be displayed along with the image of the detected non-conformance or in response to maintenance personnel or an operator of the aircraft acknowledging the alert (e.g., via an operating system response to the alert, an alert silence button, an alert clear signal, or the like).

Method 800 may then conclude.

Several examples and embodiments of the apparatus and methods are disclosed herein that include a variety of components, features, and functionalities. It will be understood that the various examples and embodiments of the apparatus and methods disclosed in the present disclosure may include any of the components, features, and functionalities of any of the other examples and embodiments of the apparatus and methods disclosed in the present disclosure in any combination, and all of such possibilities are intended to be within the spirit and scope of the present disclosure.

Having the benefit of the teachings presented in the foregoing description and the associated drawings, many modifications of the disclosed subject matter will become apparent to one skilled in the art to which this disclosure pertains. Therefore, it is to be understood that the disclosure is not to be limited to the specific examples and embodiments provided and that modifications thereof are intended to be within the scope of the appended claims. Moreover, although the foregoing disclosure and the associated drawings describe certain illustrative combinations of elements and/or functions, it will be appreciated that different combinations of elements and/or functions may be realized without departing from the scope of the appended claims.

What is claimed is:

1. A method, comprising:
forming a stop joint by pivoting a truck lever of a levered landing gear in a first direction relative to a first shock strut of the levered landing gear until a first contact surface of a first stop pad contacts a second contact surface of a second stop pad, wherein the first stop pad is included on the first shock strut, the second stop pad is included on the truck lever; and
measuring a first condition of the stop joint via a first sensor disposed with the levered landing gear.

2. The method of claim 1, further comprising, in response to detecting the first condition of the stop joint satisfying a threshold, generating an alert associated with the first condition.

3. The method of claim 1, further comprising:
opening the stop joint by pivoting the truck lever in a second direction, opposite to the first direction, relative to the first shock strut to expose the first contact surface and the second contact surface;
observing, via a camera, a second condition of the stop joint that includes at least one of:
a surface condition of at least one of the first contact surface or the second contact surface; or
a debris presence in the stop joint; and
in response to detecting the second condition of the stop joint satisfying a threshold, generating an alert associated with the second condition.

4. The method of claim 1, further comprising, calibrating the first sensor based on a nominal condition of the stop joint.

5. The method of claim 1, wherein the first sensor is a gap sensor disposed in the first stop pad, and wherein the first condition of the stop joint measured by the gap sensor includes a gap distance between at least a portion of the first contact surface and at least a portion of the second contact surface.

6. The method of claim 1, wherein the first sensor is a thickness sensor disposed in the second stop pad, and wherein the first condition of the stop joint measured by the thickness sensor includes a thickness of the second stop pad.

7. The method of claim 1, further comprising:
measuring a second condition of the stop joint via a second sensor disposed with the levered landing gear in a different one of the first contact surface and the second contact surface than the first sensor.

8. A method, comprising:
calibrating a first sensor to measure a first condition between a first stop pad and a second stop pad of a levered landing gear;
measuring the first condition when the first stop pad is in contact with the second stop pad;

in response to the first condition satisfying a threshold, generating an alert related to the first condition;

exposing a first stop surface of the first stop pad and a second stop surface of the second stop pad by opening a stop joint formed by the first stop pad and the second stop pad;

capturing an image of at least one of the first stop surface or the second stop surface via a camera mounted on the levered landing gear;

analyzing the image to determine a second condition including at least one or a debris presence in the stop joint or a surface condition of the at least one of the first stop surface of the second stop surface; and in response to the second condition satisfying a second threshold, generating a second alert related to the second condition.

9. The method of claim 8, wherein the levered landing gear includes:

a first shock strut that includes the first stop pad;

a second shock strut disposed concentrically with the first shock strut to extend along a shared extension axis relative to the first shock strut; and a truck lever that includes the second stop pad and is coupled to the first shock strut and the second shock strut to pivot relative to the first shock strut between an extended position and a static position relative to the first shock strut, and wherein the first stop pad makes physical contact with the second stop pad when the truck lever is in the static position to form a stop joint for the levered landing gear.

10. The method of claim 9, wherein the first sensor is a gap sensor, and wherein the first condition is a gap distance between the first stop pad and the second stop pad while the truck lever is in the static position.

11. The method of claim 8, wherein the first sensor is a thickness sensor disposed of in one of the first stop pad and the second stop pad, and wherein the first condition includes a combined thickness of the first stop pad and the second stop pad.

12. The method of claim 8, wherein the first sensor is a thickness sensor disposed in the first stop pad, and wherein the first condition includes a thickness of the first stop pad.

13. The method of claim 8, wherein the first sensor is a thickness sensor disposed in the second stop pad, and wherein the first condition includes a thickness of the second stop pad.

14. A method, comprising:

calibrating a first sensor to measure a first condition between a first stop pad and a second stop pad of a levered landing gear wherein the levered landing gear includes:

a first shock strut that includes the first stop pad;

a second shock strut disposed concentrically with the first shock strut to extend along a shared extension axis relative to the first shock strut; and a truck lever that includes the second stop pad and is coupled to the first shock strut and the second shock strut to pivot relative to the first shock strut between an extended position and a static position relative to the first shock strut, and wherein the first stop pad makes physical contact with the second stop pad when the truck lever is in the static position to form a stop joint for the levered landing gear;

measuring the first condition when the first stop pad is in contact with the second stop pad; and in response to the first condition satisfying a threshold, generating an alert related to the first condition.

15. The method of claim 14, wherein the first sensor is a gap sensor, and wherein the first condition is a gap distance between the first stop pad and the second stop pad while the truck lever is in the static position.

16. The method of claim 14, wherein the first sensor is a thickness sensor disposed of in the first stop pad, and wherein the first condition includes a combined thickness of the first stop pad and the second stop pad.

17. The method of claim 14, wherein the first sensor is a thickness sensor disposed of in the second stop pad, and wherein the first condition includes a combined thickness of the first stop pad and the second stop pad.

18. The method of claim 14, wherein the first sensor is a thickness sensor disposed in the first stop pad, and wherein the first condition includes a thickness of the first stop pad.

19. The method of claim 14, wherein the first sensor is a thickness sensor disposed in the second stop pad, and wherein the first condition includes a thickness of the second stop pad.

20. The method of claim 14, further comprising:

exposing a first stop surface of the first stop pad and a second stop surface of the second stop pad by opening a stop joint formed by the first stop pad and the second stop pad;

capturing an image of at least one of the first stop surface or the second stop surface via a camera mounted on the levered landing gear;

analyzing the image to determine a second condition including at least one or a debris presence in the stop joint or a surface condition of the at least one of the first stop surface of the second stop surface; and in response to the second condition satisfying a second threshold, generating a second alert related to the second condition.

* * * * *